United States Patent Office 3,102,914
Patented Sept. 3, 1963

3,102,914
2-FORMYLMETHYL-4-OXO-TETRA-
HYDRONAPHTHALENES
Raymond G. Wilkinson, Montvale, N.J., and Andrew S. Kende, Hartsdale, N.Y., assignors to American Cyanamid Company, New York, N.Y., a corporation of Maine
No Drawing. Filed June 18, 1959, Ser. No. 821,093
3 Claims. (Cl. 260—590)

This invention relates to new organic compounds and more particularly is concerned with novel 2-carboxymethyl and 2-formylmethyl-4-oxo-tetrahydronaphthalenes which may be represented by the following general formula:

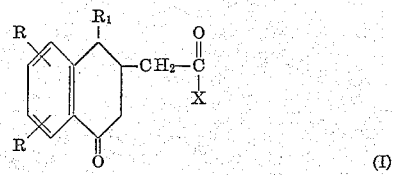

(I)

wherein X is hydrogen, halogen or hydroxy, R is hydrogen, halogen, hydroxy, lower alkyl, lower alkoxy, or an aralkoxy radical and $R_1$ is hydrogen, hydroxy, lower alkyl or a lower alkoxy radical. Suitable lower alkyl and lower alkoxy groups contemplated by the present invention are those having up to above 6 carbon atoms. Suitable aralkoxy groups are benzyloxy, phenethoxy, etc. Halogen is exemplified by bromine and chlorine.

The novel compounds may be prepared by a series of reactions which involve ring closing a 3-benzylglutaric acid of the formula:

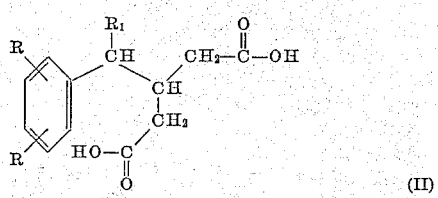

(II)

wherein R and $R_1$ are as hereinbefore defined. The ring closure is effected with a suitable condensing agent such as polyphosphoric acid or a mineral acid such as sulfuric acid. These novel tetrahydro-4-oxo-naphthalene-2-acetic acids have the formula:

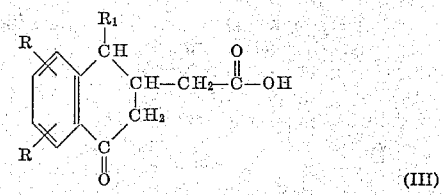

(III)

wherein R and $R_1$ are as hereinbefore defined.

The 3-benzylglutaric acids are also new compounds but are not claimed herein as they form part of the subject matter of the copending application of Raymond G. Wilkinson et al., Serial No. 748,589 filed July 15, 1958, now United States Patent No. 3,013,069.

The tetrahydro-4-oxo-naphthalene-2-acetic acid, prepared as above described, is then converted to the corresponding acyl halide by treatment with an agent such as oxalyl chloride, phosphorus pentachloride, phosphorus pentabromide, thionyl chloride, thionyl bromide, and the like. The intermediate acyl halide so formed is then converted to the final aldehyde product by a suitable reduction process. Catalytic hydrogenation has been found effective in achieving the final step. Gaseous hydrogen and a suitable catalyst such as a noble metal catalyst, e.g., palladium on charcoal is preferably used. The reaction is preferably carried out in an inert organic solvent such as benzene, toluene, xylene and the like at temperatures ranging from about 70° C. to about 150° C.

The final products are biologically active and have been found to possess antifungal activity. The antifungal spectrum of the aldehydes of this invention, representing the amount required to inhibit the growth of various typical fungi, was determined in a standard manner by the agar dilution streak technique. The minimal inhibitory concentrations, expressed in milligrams per milliliter of two typical compounds of the present invention against various test organisms is reported in the table below:

TABLE

| Organism | 8-Chloro-1,2,3,4-tetrahydro-5-hydroxy-4-oxo-2-naphthaleneacetaldehyde | 8-Chloro-1,2,3,4-tetrahydro-5-methoxy-4-oxo-2-naphthaleneacetaldehyde |
|---|---|---|
| Candida albicans | 0.250 | 1 |
| Saccharmyces carlsbergensis | 0.125 | 0.500 |
| Mucor rammanianus | 0.250 | 1 |
| Fusarium episphaeria | 0.250 | 0.500 |
| Hormodendrum cladosporoides | 0.250 | 1 |
| Trichophyton mentagrophytes | 0.062 | 0.125 |
| Microsporum gypseum | 0.062 | 0.250 |
| Botrytis cinerea | 0.250 | 0.500 |
| Penicillium digitatum | 0.500 | 1 |
| Myrothecium verrucaria | 0.250 | 1 |
| Alternaria fasciculata | | |
| Aspergillus fumigatis | 0.250 | 1 |

The aldehydes of this invention are also highly useful intermediates for the preparation of substituted trioxo-octahydroanthracenes and octahydronaphthacenes described and claimed in the copending application of Raymond G. Wilkinson et al., Serial No. 790,051, filed January 30, 1959, now United States Patent No. 3,002,993. As described in detail in this application the tetrahydro-4-oxo-naphthalene-2-acetic acids of this invention can be converted to the corresponding acyl halide by treatment with a suitable agent such as oxalyl chloride, or alternatively, can be converted to a mixed carboxylic-carbonic anhydride derivative. Diethyl malonate is then acylated and the resultant acyl malonate cyclized to the octahydroanthracene. The octahydroanthracene can be treated to remove the carbethoxy group or can be converted to 2-carboxamido-octahydroanthracene by first treating with alcoholic ammonia at 70–110° in a sealed vessel followed by strong acid hydrolysis.

The resulting products have the following general formula:

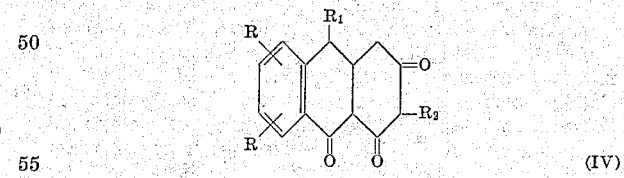

(IV)

wherein R is hydrogen, halogen, hydroxy, lower alkyl, lower alkoxy, acyloxy or an aralkoxy radical, $R_1$ is hydrogen, hydroxy, lower alkyl or a lower alkoxy radical, and $R_2$ is hydrogen, cyano, carboxamido or COOX wherein X is lower alkyl, mononuclear aryl or mononuclear aralky.

The compounds of this invention may also be used to prepare novel tetracyclic compounds represented by the following general formula:

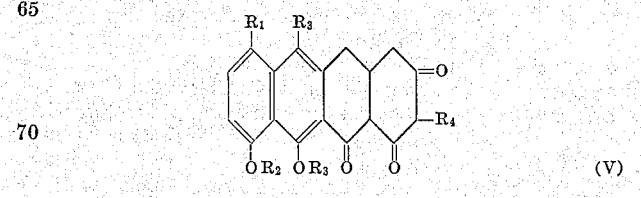

(V)

wherein $R_1$ is hydrogen or halogen, $R_2$ is hydrogen, lower alkyl, acyl or mononuclear aralkyl, $R_3$ is hydrogen or lower alkyl and $R_4$ is hydrogen, cyano or COOX wherein X is lower alkyl, mononuclear aryl or mononuclear aralkyl. Suitable lower alkyl and lower alkoxy groups are those having up to about 6 carbon atoms. Suitable aralkoxy groups are benzyloxy, phenethoxy, etc. Suitable mononuclear aralkyl substituents are benzyl, phenethyl, phenylpropyl, phenylbutyl, etc. and suitable mononuclear aryl substituents are exemplified by phenyl and substituted phenyl, suitable substituents on the phenyl ring being —Cl, —Br, —I, —$NO_2$ and lower alkyl radicals containing from 1 to 4 carbon atoms. Halogen is exemplified by chlorine and bromine.

In order to prepare the novel tetracyclic compounds represented by Formula V above, the tetrahydronaphthaleneacetic acid is first converted to the corresponding acyl halide by treatment with an agent such as oxalyl chloride. The intermediate acyl halide so formed is then converted to the desired naphthaleneacetaldehyde by a suitable reduction process. The aldehyde so formed is then treated with cyanoacetamide to form the corresponding dicyano glutaramide, which product is hydrolyzed in hydrochloric acid in the conventional manner. The glutaric acid is then subjected to a two-step methylation and the resulting product is treated with sodium hydride to form the corresponding octahydroanthraceneacetate. This product is then brominated to form the appropriate bromoketone which is treated with boiling collidine to form the corresponding naphthol. This latter product is methylated with potassium carbonate and dimethyl sulfate. The tricyclic acid is obtained by alkaline hydrolysis and is then treated with oxalyl chloride, or alternatively with ethyl chloroformate and then with malonic ester and finally with sodium hydride to form the desired tetracyclic ester.

The invention will be described in greater detail in conjunction with the following specific examples.

EXAMPLE 1

*Preparation of 8-Chloro-5-Methoxy-4-Oxo-1,2,3,4-Tetrahydronaphthalene-2-Acetic Acid*

94.0 grams (0.6 mole) of 2-chloro-5-methoxytoluene [Peratoner and Condorelli, Gazz. Chim. Ital. 28, I, 213 (1898)] are added to 600 milliliters of reagent grade carbon tetrachloride, 117.4 grams (0.66 mole) of N-bromosuccinimide and 0.1 gram benzoyl peroxide. The reaction mixture is stirred at reflux temperature and additional 0.1 gram quantities of benzoyl peroxide are added after 1½ and 18 hours. After 21 hours the volume of solvent is reduced to approximately 250 milliliters and the succinimide filtered off. The filtrate is washed with three 200 milliliter portions of water, dried over anhydrous $MgSO_4$ and filtered. The solvent is removed under reduced pressure and the residual oil crystallized on standing overnight. Yield of crude 2-chloro-5-methoxybenzyl bromide, 131.0 grams. The pure compound crystallizes from (20–40°) petroleum ether as white needles, melting point 55.5–57.5°.

*Analysis.*—Calculated for $C_8H_8OClBr$: C, 40.8; H, 3.42; Cl, 15.07; Br, 33.95. Found: C, 40.59; H, 3.66; Cl, 14.88; Br, 33.97.

13.10 grams (0.55 mole) of 2-chloro-5-methoxybenzyl bromide in 300 milliliters of absolute ethanol is added over a 1 hour period to a refluxing solution of diethylmalonate (145 grams, 0.9 mole) and sodium methylate (32.4 gram, 0.6 mole) in absolute ethanol. The refluxing is continued for an additional 2½ hours and the reaction mixture concentrated to approximately half volume. The sodium bromide is filtered off and the filtrate acidified by the slow addition of acetic acid. The remainder of the solvent is removed under reduced pressure and the residual oil taken up in ether. The ethereal solution is washed with three 200 milliliter portions of water and dried over anhydrous $MgSO_4$. The ether and excess diethyl malonate are removed under water pump pressure. Diethyl 2-chloro-5-methoxybenzyl-malonate is collected at 155–68°/0.4–0.8 mm.; yield: 90.0 grams; $n_D^{25}$ 1.5030. Overall yield based on 2-chloro-5-methoxytoluene is 48%.

*Analysis.*—Calculated for $C_{15}H_{19}O_5$ Cl: C, 57.2; H, 6.08; Cl, 11.27. Found: C, 57.38; H, 6.32; Cl, 11.09.

A solution of 105 grams (0.33 mole) of diethyl 2-chloro-5-methoxybenzylmalonate in 360 milliliters of dry ether is added slowly with stirring to 19.5 grams (0.513 mole) of $LiAlH_4$ dissolved in 700 milliliters of dry ether. The mixture is stirred and refluxed for 4½ hours before decomposing the excess hydride with ethyl acetate. The mixture is acidified with 6 N HCl, washed with water, and allowed to stand over 70 milliliters of 5 N NaOH over the weekend. The ether layer is washed with $H_2O$, dried over $MgSO_4$ and concentrated to an almost colorless oil which turns to a mushy solid on seeding. Distillation at 0.1 mm. gives 64 grams (84%) of a colorless oil at 160–175° with a small forerun at 130–160°. On seeding, the main fraction gives white crystals of 2-(2'-chloro-5'-methoxybenzyl)-1,3-propanediol, melting point 41–46°.

*Analysis.*—Calculated for $C_{11}H_{15}O_3Cl$: C, 57.2; H, 6.54; Cl, 15.4. Found: C, 57.53; H, 6.66; Cl, 15.35.

A solution of 2-(2'-chloro-5'-methoxybenzyl)-1,3-propanediol (100 grams, 0.435 mole) in 500 milliliters benzene and pyridine (95 grams, 1.2 moles) is cooled to 5°. Methanesulfonylchloride (114 grams, 1.0 mole) is added over a thirty minute period, the temperature of the reaction mixture being maintained between 5–15°. The reaction mixture is stored at 5° for 16 hours. The precipitated white crystals are collected on a filter and washed thoroughly with five 100 milliliter portions of benzene. The combined washings and filtrate are washed with 250 milliliters 1 N sodium bicarbonate, then with 200 milliliters of water. The benzene layer is treated with Norit, dried with anhydrous magnesium sulfate and the volatile solvent removed in vacuo. Yield of crude 2-(2'-chloro-5'-methoxybenzyl)-1,3-propanediol, bis-methane sulfonate is 172.3 grams. Recrystallization of 148 grams of the crude material from 300 milliliters of n-butanol yields 135.0 grams of white crystals. Melting point 75–77° (93.7%).

*Analysis.*—Calculated for $C_{13}H_{19}ClS_2O_7$: C, 40.4; H, 4.95; Cl, 9.19; S, 16.6. Found: C, 40.59; H, 5.09; Cl, 9.03; S, 16.58.

A solution of potassium cyanide (47.7 grams, 0.765 mole) in 230 milliliters of water is added to a solution of 2 - (2'-chloro-5'-methoxybenzyl) - 1,3 - propanediol, bis-methane sulfonate (135.0 grams, 0.348 mole) in 690 milliliters of ethanol. The reaction mixture is refluxed on a steam bath for 4.5 hours, during which time it changes from light yellow to dark green. A 230 milliliter portion of 10 N sodium hydroxide is then added and refluxing continued for an additional 16 hours. At the end of this period, the solution has completely lost its green color and is amber. The solution is concentrated to approximately 600 milliliters by distillation at atmospheric pressure and then extracted with three 300 milliliter portions of ether. The aqueous layer is treated with Norit and filtered; the filtrate cooled to 10° and acidified by the slow addition of 200 milliliters concentrated hydrochloric acid. The white solid which precipitates is collected on a filter and then dissolved in 350 milliliters of 1 N sodium bicarbonate. This yellow solution is slowly poured into 200 milliliters of 6 N hydrochloric acid and the β-(2-chloro-5-methoxybenzyl)-glutaric acid separates as a tan oil which solidifies upon cooling in an ice bath. It is collected on a filter and dried in vacuo over $P_2O_5$. Yield: 69.0 grams (70%); melting point 102–109°. On dissolving a small sample in 15 milliliters of $H_2O$ and 2 milliliters acetone at the boiling point, filtering and cooling, white crystals are obtained. Melting point 117–118° (uncorr.).

*Analysis.*—Calculated for $C_{13}H_{15}O_5Cl$: C, 54.5; H, 5.27; Cl, 12.37. Found: C, 54.25; H, 5.53; Cl, 12.65.

Polyphosphoric acid (600.0 grams) is poured onto β-(2-chloro-5-methoxybenzyl)-glutaric acid (60.0 grams, 0.21 mole). The reactants are thoroughly mixed at room temperature and then heated at 50–60° for two hours with intermittent stirring. The reaction mixture turns a light yellow almost immediately, gradually darkens, to a tannish yellow. After two hours the reaction mixture is slowly poured into six liters of cool water with vigorous stirring. After storing at 5° for 14 hours the white crystals are collected on a filter, washed with four 250 milliliter portions of water and dried in vacuo over $P_2O_5$. Weight of crude 8-chloro-5-methoxy-4-oxo-1,2,3,4-tetrahydro-naphthalene-2-acetic acid, 50.0 grams. Melting point 186–191°; yield, 88.5%. The crude material is dissolved in 450 milliliters of refluxing ethanol, filtered, and the light yellow filtrate allowed to stand at room temperature for two days. The white crystals which separate are collected on a filter and dried in vacuo over $P_2O_5$. Yield of pure material 41.4 grams (73.3%). Melting point, 139–196°.

Analysis.—Calculated for $C_{13}H_{13}ClO_4$: C, 58.1; H, 4.87; Cl, 13.21. Found: C, 57.69; H, 4.98; Cl, 13.25.

EXAMPLE 2

*Preparation of 8-Chloro-5-Methoxy-4-Oxo-1,2,3,4-Tetrahydronaphthalene-2-Acetyl Chloride*

Five milliliters of oxalyl chloride in 50 milliliters benzene is added dropwise, over a thirty minute period, to a refluxing suspension of 5.4 grams (0.020 mole) of 8-chloro-5-methoxy-4-oxo-1,2,3,4-tetrahydronaphthalene-2-acetic acid in 50 milliliters benzene. The reaction mixture is refluxed an additional thirty minutes after all the oxalyl chloride is added. The resultant dark brown solution is concentrated to a dark brown oil in vacuo. A portion of the crude acid chloride is taken up in 40 milliliters of ether and concentrated in vacuo to a dark yellow solid. The residual solid is slurried in 50 milliliters of ether, collected on a filter and washed twice with ether. Yield of 8-chloro-5-methoxy-4-oxo-1,2,3,4-tetrahydronaphthalene-2-acetyl chloride is 1.6 grams $\lambda_{max}^{nujol}$ 5.52, 5.91μ melting point 80–82°.

Analysis.—Calculated for $C_{13}H_{12}Cl_2O_3$: C, 54.4; H, 4.22; Cl, 24.68; OMe, 10.8. Found: C, 54.60; H, 4.54; Cl, 23.29; OMe, 10.74.

EXAMPLE 3

*Preparation of 8-Chloro-5-Methoxy-4-Oxo-1,2,3,4-Tetrahydronaphthalene-2-Acetaldehyde*

1.08 grams of 8-chloro-5-methoxy-4-oxo-1,2,3,4-tetrahydronaphthalene-2-acetic acid is added to 10 milliliters of anhydrous benzene. The suspension is brought to reflux with stirring, and a solution of 1.0 milliliter oxalyl chloride in 10 milliliters anhydrous benzene added dropwise over a period of 30 minutes. The solution is kept at reflux for an additional 30 minutes and allowed to cool. The liquid is then evaporated in vacuo at room temperature to give the oily acid chloride. The acid chloride is redissolved in 40 milliliters of anhydrous toluene, then 0.30 gram of 10% palladium on charcoal is introduced. The system is swept with nitrogen, then a slow stream of hydrogen is introduced and maintained. The mixture is stirred and heated to reflux in the hydrogen stream for two hours. The hydrogen stream is replaced by nitrogen and the solution allowed to cool. The catalyst is removed by filtration and washed with additional solvent. The combined filtrates are diluted with some ether, then washed thoroughly with sodium bicarbonate solution, then with water, and dried over sodium sulfate. Evaporation of the solvent gives an oil which is crystallized from ether to give 382 milligrams of cream colored 8-chloro-5-methoxy-4-oxo-1,2,3,4-tetrahydronaphthalene-2-acetaldehyde, melting point 90–91°.

EXAMPLE 4

*Preparation of 8-Chloro-5-Hydroxy-4-Oxo-1,2,3,4-Tetrahydronaphthalene-2-Acetaldhyde*

A mixture of 1.08 grams of 8-chloro-5-hydroxy-4-oxo-1,2,3,4-tetrahydronaphthalene-2-acetic acid prepared by refluxing 8-chloro-5-methoxy-4-oxo-1,2,3,4-tetrahydronaphthaleneacetic acid with 48% aqueous hydrobromic acid for one hour, and 10 milliliters of anhydrous benzene are brought to reflux temperature. To the boiling solution is added, dropwise over a period of 20 minutes, 0.9 gram oxalyl chloride in 5 milliliters anhydrous benzene. The solution is refluxed for an additional 20 minutes and allowed to stand at room temperature for 15 hours. The solution is then freed from solvent on the vacuum line. The resulting pale yellow oily acid chloride is redissolved in sufficient anhydrous benzene to make 3.5 milliliters of solution. One milliliter of this solution is added to 15 milliliters of anhydrous toluene containing 80 milligrams of 10% palladium-on-charcoal. The mixture is contacted with a stream of hydrogen and the mixture is brought to reflux with vigorous stirring. After two hours the hydrogenation is discontinued and the solution allowed to cool. The catalyst is removed by filtration and washed with benzene. The combined filtrates are diluted with ether then washed thoroughly with sodium bicarbonate solution, then with water and dried over sodium sulfate to yield on crystallization from petroleum ether, 87 milligrams of colorless 8-chloro-5-hydroxy-4-oxo-1,2,3,4-tetrahydronaphthalene-2-acetaldehyde, melting point 64–65°.

EXAMPLE 5

*Preparation of 8-Chloro-5-Methoxy-4-Oxo-1,2,3,4-Tetrahydronaphthalene-2-Acetaldhyde*

A solution of oxalyl chloride (5 milliliters) in benzene (25 milliliters) is added dropwise, over a thirty-minute period, to a refluxing suspension of 8-chloro-5-methoxy-4-oxo-1,2,3,4-tetrahydronaphthalene-2-acetic acid (5.4 grams, 0.020 mole) in benzene (50 milliliters). The reaction mixture is refluxed an additional thirty minutes after all of the oxalyl chloride is added. The resultant dark brown solution is concentrated to dryness in vacuo and the crude acid chloride dissolved in 400 milliliters of toluene. The solution is filtered and 1.0 gram of 5% palladium on barium sulfate added. Hydrogen is passed through at a vigorous rate and the solution is refluxed. After 155 minutes, 65% of the theoretical amount of hydrogen chloride is evolved. An additional 1.0 gram of 5% palladium on barium sulfate is added. After an additional 113 minutes 90–95% of the theoretical amount of hydrogen chloride is evolved. The system is flushed with nitrogen, cooled and the catalyst filtered off. The toluene solution is washed with three 100 milliliter portions of 1 N sodium bicarbonate solution and three times with 50 milliliter portions of water. The organic layer is dried over anhydrous magnesium sulfate, filtered and concentrated to a tan solid in vacuo. The crude aldehyde is slurried in 100 milliliters of ether and the cream colored crystals are collected on a filter and air-dried. The yield of 8-chloro-5-methoxy-4-oxo-1,2,3,4-tetrahydronaphthalene-2-acetaldehyde is 2.82 grams, melting point 89–91°.

Analysis.—Calculated for $C_{13}H_{13}ClO_3$: C, 61.78; H, 5.18; Cl, 14.02; OMe, 12.20. Found: C, 61.63; H, 5.40; Cl, 13.92; OMe, 12.12.

The following example illustrates the transformation of the tetrahydro-4-oxo-naphthalene-2-acetic acid of this invention to a substituted trioxooctahydroanthracene of the Formula IV above and as described in the aforesaid copending application of Raymond G. Wilkinson et al., Serial No. 790,051.

EXAMPLE 6

*Preparation of 2-Carboxamido-5-Chloro-8-Methoxy-1,3, 9-Trioxo-1,2,3,4,4a,9,9a,10-Octahydroanthracene*

8 - chloro - 5 - methoxy - 4 - oxo - 1,2,3,4 - tetrahydronaphthalene-2-acetic acid (10.8 grams, 0.040 mole), is suspended in 50 milliliters of sodium dried benzene. The suspension is refluxed and a solution of oxalyl chloride (6.42 milliliters, 0.080 mole) in 50 milliliters of sodium dried benzene is added dropwise over a thirty minute period. A clear yellow solution forms as the reaction proceeds. The solution is refluxed an additional thirty minutes and then the excess oxalyl chloride and benzene are removed under reduced pressure. The oily residue is dissolved in 25 milliliters of benzene and again concentrated to an oil under reduced pressure. The oily acid chloride is dissolved in 100 milliliters of sodium dried toluene.

The magnesium salt of diethyl malonate is prepared by heating magnesium metal (972.8 milligrams, 0.040 mole), carbon tetrachloride (0.3 milliliter), absolute ethanol (7.28 milliliters) and diethyl malonate (6.08 milliliters, 0.40 mole) intermittently on a steam bath for fifteen minutes, then 100 milliliters of sodium dried ether is added and refluxed with stirring until all of the magnesium is dissolved (approximately two hours). The ethereal solution of magnesiomalonic ester is cooled to room temperature and the toluene solution of the acid chloride prepared above is added dropwise, with stirring, over a thirty minute period. After seven minutes sodium chloride begins precipitating. After ten minutes the magnesium salt of the acylated malonic ester begins separating as a yellow gum. The reaction mixture is refluxed for twenty minutes after the addition of the acid chloride, is cooled to room temperature and sodium hydride added (4.0 grams, 0.160 mole). An additional 200 milliliters of sodium dried toluene is added and the ether removed by distillation. The reaction mixture is then refluxed for seventeen hours. The dark brown suspension is cooled to room temperature and 10 milliliters of absolute ethanol added to decompose the excess sodium hydride. The reaction mixture is mechanically shaken for one hour with 200 milliliters of 1 N HCl, the toluene layer separated, washed twice with water, dried over anhydrous magnesium sulfate and filtered. The filtrate is concentrated under reduced pressure to a syrupy residue and 50 milliliters of absolute ethanol added. The mixture is heated on a steam bath and allowed to slowly cool to room temperature. Brownish yellow crystals of crude cyclized product are deposited. Yield 4.97 grams (34%), M.P. 159–64°. 4.68 grams of the crude are recrystallized from 200 milliliters of absolute ethanol and 20 milliliters of dimethylformamide, yielding 3.72 grams of the pure octahydroanthracene (26.7%), M.P. 164–7°.

*Analysis.*—Calculated for $C_{18}H_{17}ClO_6$: C, 59.26; H, 4.70; Cl, 9.72. Found: C, 59.39; H, 4.69; Cl, 9.76.

A suspension of 2-carbethoxy-5-chloro-8-methoxy-1,3,9-trioxo-1,2,3,4,4a,9,9a,10-octahydroanthracene (1.0 gram, 0.00276 mole) in 25 milliliters of absolute methanol contained in a stainless steel bomb is cooled to 0° and saturated with anhydrous ammonia. The bomb is sealed, heated at 80° for five hours and then allowed to stand at room temperature overnight. The methanol is evaporated off under an air jet at room temperature and the residue slurried in 10 milliliters of 1 N NaOH. The tan solid is collected on a filter and then heated in 10 milliliters of ethanol. The insoluble portion is collected on a filter and dried in vacuo over $P_2O_5$, to yield 350 milligrams of crude product. 150 milligrams of this material is heated on a steam bath for ten minutes with 15 milliliters of 4 N HCl. The yellow crystals are collected and recrystallized from a dimethylformamide-water mixture, yielding 65 milligrams of 2-carboxamido-5-chloro-8-methoxy-3-(or 1- or 9-) imino-1,9-dioxo-1,2,3,4,4a,9,9a,10-octahydroanthracene, M.P. 194–197° with dec.

Crude 2-carboxamido-5-chloro-8-methoxy-3-(or 1- or 9 - )imino - 1,9 - dioxo - 1,2,3,4,4a,9,9a,10 - octahydroanthracene (100 milligrams) is heated on a steam bath with 5 milliliters of 4 N HCl for three hours and then allowed to stand at room temperature for an additional three hours. The reaction mixture is filtered and the crude amide recrystallized from a dimethylformamide-ethanol mixture, yielding 55 milligrams of pure 2-carboxamido - 5 - chloro - 8 - methoxy - 1,3,9 - trioxo - 1,2,3,4,4a,9,9a,10-octahydroanthracene, M.P. 239–241° dec.

*Analysis.*—Calculated for $C_{16}H_{14}NClO_5$: C, 57.24; H, 4.20; N, 4.17; Cl, 10.56. Found: C, 57.32; H, 4.54; N, 4.39; Cl, 10.59.

The following example illustrates the transformation of the tetrahydro-4-oxo-naphthalene-2-acetaldehyde of this invention to an octahydronaphthacene of the Formula V above and as described in the aforesaid copending application of Raymond G. Wilkinson et al. Serial No. 790,051.

EXAMPLE 7

*Preparation of Ethyl 10-Benzyloxy-7-Chloro-11-Methoxy-1,3,12 - Trioxo - 1,2,3,4,4a,5,12,12a - Octahydronaphthacene-2-Carboxylate*

Cyanoacetamide (8.0 grams, .095 mole) and 8-chloro-1,2,3,4 - tetrahydro - 5 - methoxy - 4 - oxo - 2 - naphthalene are dissolved in absolute ethanol (300 milliliters) with the aid of heat. The solution is cooled, filtered, five drops of piperidine added and the liquid is allowed to stand at room temperature for 24 hours. The white crystals (11.7 grams, 92%) which deposit are collected by suction filtration, washed with ether, and air-dried. This highly insoluble product has a melting point of 140–155°, but the melting point of other batches run in a similar manner varies from 105 to 160°, despite constant analyses. The sample is dried for analysis at 60° for 3 hours in vacuo.

*Analysis.*—Calculated for $C_{19}H_{19}O_4N_4Cl \cdot C_2H_6O$: C, 56.2; H, 5.62; N, 12.49; Cl, 7.82. Found: C, 55.61; H, 5.62; N, 12.54; Cl, 8.40.

2,2' - dicyano - 3 - (8 - chloro - 1,2,3,4 - tetrahydro - 5 - methoxy - 4 - oxo - 2 - naphthylmethyl)glutaramide (10.0 grams, 0.0249 mole) is slurried in a mixture of concentrated hydrochloric acid (405 milliliters) and glacial acetic acid (135 milliliters). Upon refluxing a clear yellow solution forms which gradually turns bright red then brown. After twelve hours the reaction is cooled and filtered. The filtrate is concentrated in vacuo to approximately two-thirds volume. The light yellow crystals which separate are collected on a filter, washed thoroughly with water and dried in vacuo over phosphorous pentoxide and potassium hydroxide pellets. Yield of the glutaric acid is 5.9 grams (70%), M.P. 177–80°. Recrystallization from ethyl acetate raises the melting point to 181.5–182°.

*Analysis.*—Calculated for $C_{16}H_{17}ClO_6$: C, 56.4; H, 5.03; Cl, 10.42. Found: C, 56.45; H, 5.30; Cl, 10.36.

3 - (8 - chloro - 1,2,3,4 - tetrahydro - 5 - hydroxy - 4-oxo-naphthylmethyl(glutaric acid (0.920 gram, 0.0027 mole) is dissolved in 25 milliliters of 1 N sodium hydroxide. Benzyl chloride (1.8 grams, 0.0142 mole) is added and the mixture refluxed for two hours under nitrogen. The reaction is cooled and extracted with five 20 milliliter portions of ether. The aqueous layer is separated, acidified and the tan oily solid which separates is extracted into ethyl acetate. The organic layer is dried over anhydrous magnesium sulfate, filtered and concentrated to a light tan solid in vacuo. Crude 3-(5-benzyloxy - 8 - chloro - 1,2,3,4 - tetrahydro - 4 - oxo - naphthylmethyl)glutaric acid (1.1 gram) is obtained.

An analytical sample is obtained from ethyl acetate as a colorless microcrystalline solid, M.P. 174–176°.

*Analysis.*—Calculated for $C_{23}H_{23}O_6Cl$: C, 64.2; H, 5.38; Cl, 8.25. Found: C, 64.68; H, 6.17; Cl, 8.22.

Crude 3 - (5 - benzyloxy - 8 - chloro - 1,2,3,4 - tetrahydro-4-oxo-2-naphthyl)glutaric acid (1.1 gram, 0.0024 mole) is dissolved in 50 milliliters of methanol and 1 drop of concentrated sulfuric acid is added. The solution is refluxed on a steam bath for 2 hours, concentrated in vacuo to approximately 8 milliliters and diluted with 50 milliliters of ethyl acetate. The ethyl acetate solution is washed thrice with 20 milliliter portions of 1 N sodium bicarbonate and thrice with 20 milliliter portions of water. The organic layer is dried over anhydrous magnesium sulfate, filtered and concentrated to an oily residue in vacuo. Yield of crude dimethyl 3-(5-benzyloxy-8-chloro-1,2,3,4 - tetrahydro - 4 - oxo - naphthylmethyl)glutarate is 1.0 gram.

Recrystallization of crude diester from ether-petroleum-ether produces an analytical sample, colorless crystals, M.P. 62–63°.

*Analysis.*—Calculated for $C_{25}H_{27}O_6Cl$: C, 65.43; H, 5.93. Found: C, 65.10; H, 6.04.

Dimethyl 3 - (5 - benzyloxy - 8 - chloro - 1,2,3,4 - tetrahydro - 4 - oxo - naphthylmethyl)glutarate (1.73 grams, 0.0037 mole) is dissolved in 100 milliliters of toluene. sodium hydride (230 milligrams, 0.010 mole) is added and the mixture refluxed under nitrogen for 4.5 hours, cooled to room temperature and allowed to stand overnight. Additional sodium hydride (150 milligrams, 0.0063 mole) is added and the reaction is refluxed 1.5 hours. The excess hydride is decomposed by the addition of 2 milliliters of methanol. The solution is diluted with 50 milliliters of chloroform, washed twice with 25 milliliter portions of 1 N hydrochloric acid and twice with 25 milliliter portions of water. The organic layer is separated, dried over anhydrous magnesium sulfate, filtered and concentrated to an oily residue in vacuo. The residue is dissolved in 50 milliliters of ether and 80 milliliters of hexane added. Upon standing at 5° overnight small white crystals are deposited. The yield of methyl-5 - benzyloxy - 8 - chloro - 1,2,3,4,4a,9,9a,10 - octahydro - 4,10-dioxo-2-anthraceneacetate is 495 milligrams, M.P. 100–105°. Work-up of the filtrate yields an additional 200 milligrams of the desired product. Total yield of crystalline material is 44% of theory. Repeated recrystallization of crude product from ether raises the M.P. to 117–121°.

*Analysis.*—Calculated for $C_{24}H_{23}ClO_5$: C, 67.5; H, 5.41; Cl, 8.31. Found: C, 67.47; H, 5.58; Cl, 8.85.

Crystalline methyl 5-benzyloxy-8-chloro-1,2,3,4,4a,9,9a,10 - octahydro - 4,10 - dioxo - 2 - anthraceneacetate (6.5 grams) is dissolved in a mixture of ethyl acetate (40 milliliters) and glacial acetic acid (80 milliliters). Anhydrous sodium acetate powder (1.75 grams) is added and the mixture stirred magnetically until a solution is obtained. The reaction vessel is cooled to 0–5° and to the contents are slowly added, with stirring, 16 milliliters of a 1 M solution of bromine in glacial acetic acid. After addition of the bromide solution (an aliquot of the reaction possesses an ultraviolet absorption ratio ($\epsilon$ 360/$\epsilon$ 335) of 0.55 in 0.1 N alkali. The entire reaction mixture is poured into benzene, the benzene solution washed with salt solution containing a little sodium sulfite, then with four successive portions of water. The benzene layer is dried over magnesium sulfate and the solvent removed to give the crude bromoketone (7.0 grams) as a pale pink foam.

The bromoketone is dissolved in 45 milliliters freshly distilled collidine and the solution heated under nitrogen at reflux for 12 minutes. The cooled supernatant is separated from solid collidine hydrobromide by decantation, the solid washed with ether-benzene and the ether and collidine solutions combined. The extracts are washed with ice-cold 3 N sulfuric acid until the collidine odor is no longer present. The organic extracts are dried over magnesium sulfate and the solvent evaporated in vacuo. There remain 5.5 grams (84%) of methyl 5-benzyloxy-10 - hydroxy - 8 - chloro - 1,2,3,4 - tetrahydro - 4 - oxo-2 - anthraceneacetate. The analytical sample is obtained from ether, M.P. 132–134°.

*Analysis.*—Calculated for $C_{24}H_{21}O_5Cl$: C, 67.84; H, 4.98. Found; C, 67.45; H, 5.47.

To a solution of the above product and dimethyl sulfate (3.2 milliliters) in anhydrous toluene (160 milliliters) is added micronized anhydrous potassium carbonate (33 grams, previously dried 12 hours at 130°) and the stirred suspension held at reflux for six hours. The cooled mixture is filtered through a sintered-glass suction funnel and the filter cake ($K_2CO_3$) washed with benzene. The combined filtrates are reduced to 30 milliliters in vacuo and chromatographed over 100 grams of alumina. Eluates corresponding to (A) benzene to benzene-10% ethyl acetate and (B) benzene-25% ethyl acetate to benzene-50% ethyl acetate are separately collected. Concentration and recrystallization of the residues from ether gives from (A) 0.80 gram of yellow needles, M.P. 129–130°; from (B) 1.24 grams tan needles, M.P. 127–128°; mixed M.P. 127–128.5°.

The analytical sample is prepared from (B) by recrystallization from ether and drying in vacuo at 65°.

*Analysis.*—Calculated for $C_{25}H_{23}O_5Cl$: C, 68.36; H, 5.29; $OCH_3$, 14.1. Found: C, 68.49; H, 5.86; $OCH_3$, 14.65.

A solution of 25 grams potassium hydroxide, 4 milliliters water and 35 milliliters methanol is brought to reflux and allowed to cool in a nitrogen atmosphere. To the cold solution is added methyl 5-benzyloxy-10-methoxy-8-chloro - 1,2,3,4 - tetrahydro-4-oxo-2-anthraceneacetate (1.17 grams), and the suspension brought to reflux under nitrogen. After one hour of reflux the solution is evaporated in vacuo to approximately one half the original volume. The reaction mixture is poured into excess ice-cold 1 N sulfuric acid and the organic product extracted into ethyl acetate. The ethyl acetate is washed twice with water and dried over magnesium sulfate. Evaporation of solvent gives 1.09 (96%) of crystalline tricyclic acid, tan needles melting at 169–171°.

The analytical sample is recrystallized three times from ethyl acetate to give straw-colored needles, M.P. 175–176°. Solvent of crystallization is removed by drying at 100° in vacuum for four hours.

*Analysis.*—Calculated for $C_{24}H_{21}O_5Cl$: C, 67.81; H, 4.96; $OCH_3$, 7.31. Found: C, 67.72; H, 5.06; $OCH_3$, 7.27.

A suspension of 101 grams (2.3 millimoles) of recrystallized 5 - benzyloxy - 10-methoxy-8-chloro-1,2,3,4-tetrahydro-4-oxo-2-anthraceneacetic acid in 50 milliliters of anhydrous toluene is stirred magnetically at room temperature under a dry nitrogen atmosphere. Addition of triethylamine (0.38 milliliter, 2.75 millimoles) effects solution of the acid. The mixture is cooled to —10° and ethyl chloroformate (0.26 milliliter, 2.75 millimoles) is added. The stirring at —10° under nitrogen is maintained for 15 minutes, at which time there is added 5.5 milliliters of 0.45 magnesio ethoxy diethyl malonate in toluene. The reaction mixture is allowed to stand at room temperature for 18 hours; it is then poured into excess cold 2 N sulfuric acid. The acyl malonate is extracted into benzene, the benzene extracts washed with sodium bicarbonate and water, dried over magnesium sulfate, and evaporated to leave 1.39 grams of product. The crude acyl malonate is a yellow gum having infrared maxima at 5.75–5.80$\mu$ and 5.94$\mu$, and ultraviolet spectrum identical with that of the starting acid.

The acyl malonate (1.39 grams) is dissolved in 20 milliliters of toluene and evaporated to dryness in vacuo, then held at 95° at 1 mm. vacuum for one hour. The dried acyl malonate is dissolved in 35 milliliters sodium-dried reagent toluene. To the solution is added sodium hydride in oil (1.20 grams of a solid suspension ca. 52%

NaH by weight) and the stirred mixture refluxed under a nitrogen atmosphere for twenty minutes.

The reaction mixture, which turns from the original very pale yellow to a strong golden-brown color, is cooled to room temperature and then cooled further in ice-water. The remaining sodium hydride is destroyed by the cautious dropwise addition of glacial acetic acid (3 milliliters) followed by the very slow addition of absolute ethanol. The resulting solution is poured into cold dilute sulfuric acid, the organic components extracted into ethyl acetate, and the extracts washed with sodium bicarbonate and water. After drying over magnesium sulfate the solvent is evaporated to leave an oil (which contains ca. 0.6 gram mineral oil from the NaH suspension). The oil is taken up in 35 milliliters dry ether and the solution scratched until crystallization commences. On standing of the solution in the icebox overnight there is obtained 415 milligrams (35%) of golden yellow crystals, M.P. 170–171°.

The analytical sample is recrystallized from ethyl acetate and dried at 100° for four hours in vacuum; golden needles, M.P. 169–171°.

*Analysis.*—Calculated for $C_{29}H_{25}O_7Cl$: C, 66.88; H, 4.84; $OCH_3$, 11.90. Found: C, 66.85; H, 5.08; $OCH_3$, 11.11.

This application is a continuation-in-part of our copending application Serial No. 748,613, filed July 15, 1958, now abandoned.

We claim:
1. A compound of the formula:

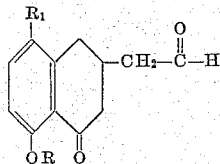

wherein $R_1$ is selected from the group consisting of chlorine and bromine, and R is selected from the group consisting of hydrogen and lower alkyl.

2. 8 - chloro-5-hydroxy-4-oxo-1,2,3,4-tetrahydronaphthalene-2-acetaldehyde.

3. 8 - chloro-5-methoxy-4-oxo-1,2,3,4-tetrahydronaphthalene-2-acetaldehyde.

References Cited in the file of this patent
FOREIGN PATENTS
651,585      Great Britain _____ Apr. 4, 1951

OTHER REFERENCES

Momsoe et al.: "Chem. Abst.," 50, Col. 13850 (1956).
Bachmann et al.: "J.A.C.S.," vol. 71, Col. 3463–8 (1949).
Elsevier's, "Encyclopedia of Organic Chemistry," series III, 12B, p. 3720 (1953).
(Copies in Library.)